United States Patent
Gieras et al.

(10) Patent No.: US 10,787,967 B2
(45) Date of Patent: Sep. 29, 2020

(54) STARTER-GENERATOR MODULES FOR GAS TURBINE ENGINES

(71) Applicant: Hamilton Sundstrand Corporation, Charlotte, NC (US)

(72) Inventors: Jacek F. Gieras, Glastonbury, CT (US); Lubomir A. Ribarov, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1257 days.

(21) Appl. No.: 14/457,798

(22) Filed: Aug. 12, 2014

(65) Prior Publication Data

US 2016/0047319 A1 Feb. 18, 2016

(51) Int. Cl.

| | |
|---|---|
| *F02C 7/275* | (2006.01) |
| *F02C 7/32* | (2006.01) |
| *F02C 7/36* | (2006.01) |
| *H02K 7/116* | (2006.01) |
| *F01D 15/10* | (2006.01) |

(Continued)

(52) U.S. Cl.
CPC .............. *F02C 7/275* (2013.01); *F01D 15/10* (2013.01); *F02C 7/32* (2013.01); *F02C 7/36* (2013.01); *H02K 7/116* (2013.01); *H02K 7/083* (2013.01); *H02K 7/1016* (2013.01); *H02K 7/1823* (2013.01)

(58) Field of Classification Search
CPC .. F02C 7/275; F02C 7/268; F02C 7/27; F02C 7/32; F02C 7/36; F05D 2260/85; H02K 7/083; H02K 7/1823; H02K 3/493; H02K 21/046; H02K 1/2786; H02K 21/12; H02K 21/22; H02K 7/116; H02K 5/1737; H02K 5/165; H02K 7/10; H02K 7/20
See application file for complete search history.

(56) References Cited

U.S. PATENT DOCUMENTS

| | | | | |
|---|---|---|---|---|
| 3,684,907 A | * | 8/1972 | Hinachi | H02K 21/44 310/155 |
| 4,873,962 A | * | 10/1989 | Safranek | F02P 1/02 123/599 |

(Continued)

FOREIGN PATENT DOCUMENTS

| | | | | |
|---|---|---|---|---|
| DE | 29607484 U1 | * | 8/1996 | ............... H02K 7/14 |
| DE | 29607484 U1 | * | 8/1996 | ............... H02K 7/14 |

OTHER PUBLICATIONS

Extended European Search Report Patent Application No. 15180391.3-1607 dated Jan. 4, 2016.

(Continued)

*Primary Examiner* — Gerald L Sung
*Assistant Examiner* — Rene D Ford
(74) *Attorney, Agent, or Firm* — Locke Lord LLP; Scott D. Wofsy; Joshua L. Jones

(57) ABSTRACT

A starter-generator module for a gas turbine engine includes an inner stator portion with an armature defining a rotation axis and an outer rotor portion disposed about the rotation axis. The outer rotor portion includes a permanent magnet and a gear teeth member. The permanent magnet is disposed about the rotation axis and the gear teeth member is defined on the outer rotor portion such that the gear teeth member transmits rotational energy to an accessory gearbox in a start mode and receives rotational energy from the accessory gearbox in a generate mode.

12 Claims, 4 Drawing Sheets

(51) Int. Cl.
    *H02K 7/10*  (2006.01)
    *H02K 7/18*  (2006.01)
    *H02K 7/08*  (2006.01)

(56) References Cited

U.S. PATENT DOCUMENTS

| | | | |
|---|---|---|---|
| 6,051,953 A * | 4/2000 | Vithayathil | H02K 19/12 |
| | | | 318/700 |
| 7,777,384 B2 | 8/2010 | Gieras et al. | |
| 7,843,155 B2 | 11/2010 | Rozman et al. | |
| 7,859,231 B2 | 12/2010 | Gieras et al. | |
| 8,013,488 B2 | 9/2011 | Berenger et al. | |
| 8,278,774 B2 * | 10/2012 | Macchia | F01D 15/10 |
| | | | 290/52 |
| 8,390,164 B1 | 3/2013 | Gieras et al. | |
| 2004/0113507 A1 * | 6/2004 | Yoda | H02K 11/048 |
| | | | 310/179 |
| 2009/0309461 A1 | 12/2009 | Berenger et al. | |
| 2010/0244446 A1 | 9/2010 | Qu et al. | |
| 2011/0252807 A1 * | 10/2011 | Huang | B64D 41/00 |
| | | | 60/788 |
| 2013/0093271 A1 * | 4/2013 | Luke | H02K 16/04 |
| | | | 310/58 |

OTHER PUBLICATIONS

Gieras, J.F., "Permanent magnet motor technology: design and applications", 3rd edition, CRC Press, Taylor & Francis Group, Boca Raton —London—New York, 2010.

* cited by examiner

STARTER-GENERATOR MODULES FOR GAS TURBINE ENGINES

BACKGROUND OF THE INVENTION

1. Field of the Invention

The present disclosure relates to gas turbine engines, and more particularly to electromagnetic starter-generators for gas turbine engines.

2. Description of Related Art

Gas turbine engines typically include a compressor section, a combustion section, and a turbine section. The compressor section ingests air from the ambient environment, compresses the air, and communicates the compressed air to the combustion section. The combustion section mixes the compressed air with fuel, ignites the reactants mixture, and communicates high-pressure combustion products to the turbine section. The turbine section expands the high-pressure combustion products, extracts work from the high-pressure combustion products, and exhausts low-pressure combustion products to the external environment.

Gas turbine engines commonly include engine accessories such as electric generators, starters, and various pumps. Some engines include combined starter-generator accessories that provide mechanical energy to the engine for starting the engine and can receive mechanical energy for purposes of generating electrical power. Such devices typically connect to the engine through an accessory gearbox that communicates mechanical energy between the engine and engine accessories. Such starter-generators can require a lubrication system including a dedicated lubricant reservoir and pump that is driven through the accessory gearbox.

Such conventional methods and systems have generally been considered satisfactory for their intended purpose. However, there is still a need in the art for improved starter-generator and accessory gearbox assemblies. The present disclosure provides a solution for this need.

SUMMARY OF THE INVENTION

A starter-generator module for a gas turbine engine includes an inner stator portion with an armature defining a rotation axis and an outer rotor portion disposed about the rotation axis. The outer rotor portion includes a permanent magnet and a gear teeth member. The permanent magnet is disposed about the rotation axis and the gear teeth member is defined on the outer rotor portion such that the gear teeth member transmits rotational energy to an accessory gearbox in a start mode and receives rotational energy from the accessory gearbox in a generate mode.

In certain embodiments, the rotor portion can include a starter-generator static housing disposed radially outward from the gear teeth member and the permanent magnet. The gear teeth member can include gear teeth facing radially outward for the rotation axis. The permanent magnet can include an annular array of permanent magnet elements with circumferentially alternating poles arranged within the gear teeth member. It is contemplated that the rotor portion can be a windingless rotor portion.

In accordance with certain embodiments, the armature can include a radially inner yoke portion connected to a plurality of radially outer armature teeth. Phase windings can be wrapped about at least two of the plurality of radially outer teeth. The phase windings can extend in parallel with the rotation axis. A control coil can also be disposed circumferentially between the phase windings. The control coil can be arranged radially outward from the phase coils. The control coil can also extend in parallel with the rotation axis and along a portion of the length of the phase windings.

It is also contemplated that in certain embodiments phase leads and control coil leads can extend through the radially inner yoke portion. The phase leads can be electrically connected to the phase windings. The control lead can be electrically connected to the control coil. It is further contemplated that the starter-generator module can include only a single electrical machine. The rotor portion of the starter-generator module can be a currentless rotor portion.

An accessory gearbox for a gas turbine engine includes a gear drive and a starter-generator module. The drive gear is configured for transmitting and receiving rotational energy to and from a gas turbine engine. The starter-generator module is operatively connected to the accessory gearbox and includes an inner stator portion and an outer rotor portion with an optional gear teeth member. The inner stator portion includes an armature that defines a rotation axis. The outer rotor portion includes a permanent magnet disposed about the rotation axis and is arranged on the outer rotor portion for transmitting rotational energy to the accessory gearbox through the drive gear in a start mode and for receiving rotational energy from the accessory gearbox through the drive gear in a generate mode.

In certain embodiments the drive gear is a first drive gear and the accessory gearbox includes a second drive gear and a gear train. The second drive gear can be operatively associated with the first drive gear and engaged with the outer rotor portion. The second drive gear can also be intermeshed with the gear train for transmitting rotational energy to another accessory connected to the accessory gearbox.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
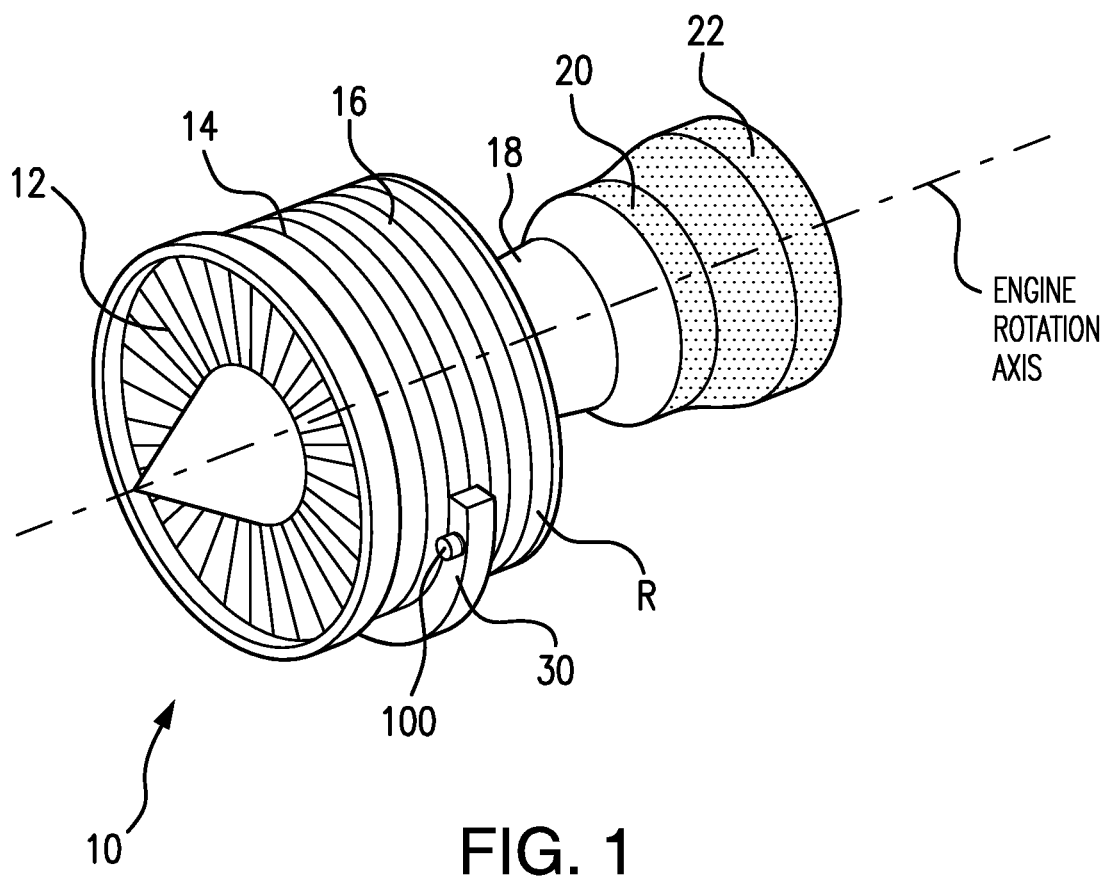
FIG. 1 is a perspective view of an exemplary embodiment of a gas turbine engine constructed in accordance with the present disclosure, showing an accessory gearbox and starter-generator module.

Reference will now be made to the drawings wherein like reference numerals identify similar structural features or aspects of the subject disclosure. For purposes of explanation and illustration, and not limitation, a partial view of an exemplary embodiment of a starter-generator module in accordance with the disclosure is shown in FIG. 1 and is designated generally by reference character 100. Other embodiments of starter-generators in accordance with the disclosure, or aspects thereof, are provided in FIGS. 2-4, as will be described. The systems and methods described herein can be used for starting gas turbine engines and generating electrical power using the gas turbine engine, such as for aircraft electric power distribution units for example.

With reference to FIG. 1, a gas turbine engine 10 including starter-generator module 100 is shown. Gas turbine engine 10 includes a fan 12, a low-pressure compressor 14, and a high-pressure-compressor 16. Gas turbine engine 10 also includes a combustor 18, a high-pressure turbine 20, and a low-pressure turbine 22. High-pressure turbine 20 and low-pressure turbine 22 are operatively associated with fan 12, low-pressure compressor 14, and high-pressure turbine 20 such that rotational energy applied to at least one of high-pressure turbine 20 and low-pressure turbine 22 is transferred to at least one of fan 12, low-pressure compressor 14, and high-pressure compressor 16 through at least one interconnecting shaft. In an exemplary embodiment, high-pressure compressor 16 and high-pressure turbine 20 are coupled by a high-pressure spool shaft (not shown for clarity reasons), low-pressure compressor 14 and low-pressure turbine 22 are coupled by a low-pressure spool shaft (not shown for clarity reasons), and fan 12 is connected to at least one of the low-pressure spool shaft and high-pressure spool shaft by a gearbox (not shown for clarity reasons).

Air from the environment external to gas turbine engine 10 enters fan 12 and then low-pressure compressor 14. Low-pressure compressor 14 compresses the air to a first pressure and communicates the air to high-pressure compressor 16. High-pressure compressor 16 further compresses the air to a second pressure higher than the first pressure and communicates the air to combustor 18. Combustor 18 receives the compressed air, mixes the air with fuel, and ignites the mixture. This produces combustion products with a third pressure higher than the second pressure.

Combustor 18 communicates the combustion products to high-pressure turbine 20. High-pressure turbine 20 expands the high-pressure combustion products, extracts work from the expanded combustion products to provide rotational energy to at least one of fan 12, low-pressure compressor 14, and high-pressure compressor 16, and communicates the combustion products to low-pressure turbine 22. Low-pressure turbine 22 further expands the combustion products, extracts additional work from the further expanded combustion products to provide additional rotational energy to at least one of fan 12, low-pressure compressor 14, and high-pressure compressor 16, and communicates the combustion products to the environment external to gas turbine engine 10.

With continuing reference to FIG. 1, gas turbine engine 10 includes an accessory gearbox 30. Starter-generator module 100 is connected to accessory gearbox 30. Accessory gearbox 30 in turn couples starter-generator module 100 such that it is operatively associated with at least one of a low-pressure spool including low-pressure turbine 22 and a high-pressure spool including high-pressure turbine 20. It is to be understood and appreciated that accessory gearbox 30 allows for operation of starter-generator module 100 in both a 'start mode' and a 'generate mode'. In the 'start mode', electrical power supplied to starter-generator module 100 by an auxiliary power unit, ground power unit, or on-board battery or the like is converted into rotational energy. Accessory gearbox 30 transfers the rotational energy into gas turbine engine 10, causes rotation of rotatable components therein (e.g. low-pressure compressor 14, high-pressure compressor 16, high-pressure turbine 20, or low-pressure turbine 22), and starts gas turbine engine 10. In the 'generate mode' rotational energy from the rotatable components is transferred by accessory gearbox 30 to starter-generator module 100. Starter-generator module 100 converts the transferred rotational energy into electrical power. This can provide starting capability when gas turbine engine 10 is stopped (at rest) and generating capability when gas turbine engine 10 is running.

Figure 2:
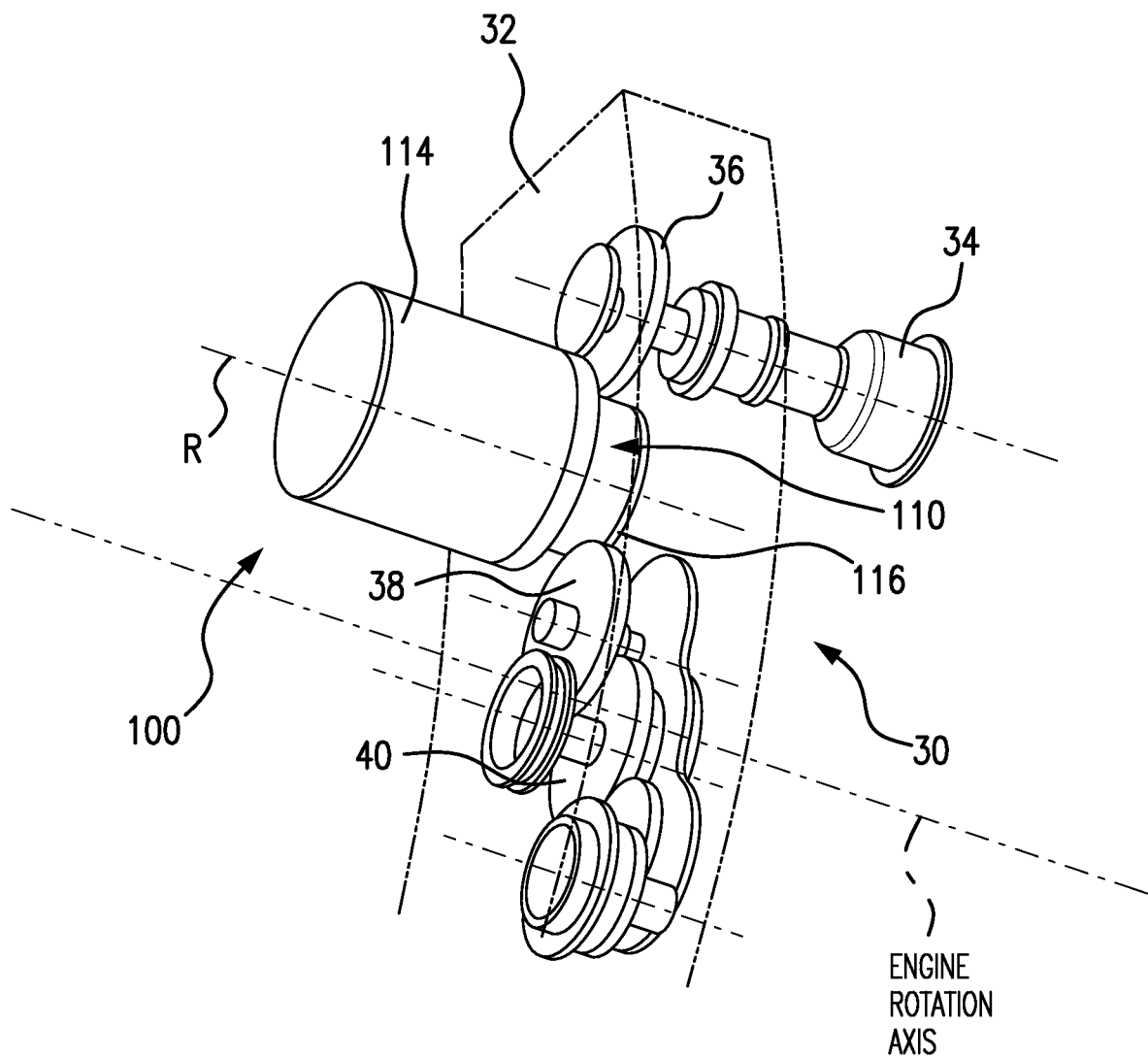
FIG. 2 is a schematic perspective view of the accessory gearbox and starter-generator of FIG. 1, showing the arrangement of drive gears within the accessory gearbox.

With reference to FIG. 2, accessory gearbox 30 and starter-generator module 100 are shown schematically. Accessory gearbox 30 includes an accessory gearbox case 32, a turbine interconnect shaft 34, a first drive gear 36, a second drive gear 38, and a gear train 40. Accessory gearbox case 32 is connected to gas turbine engine 10 (shown in FIG. 1). First drive gear 36, second drive gear 38 and gear train 40 are disposed within an interior of accessory gearbox case 32. Turbine interconnect shaft 34 is connected between gas turbine engine 10 and accessory gearbox 30 and extends into accessory gearbox case 32 where it connects to first drive gear 36. First drive gear 36 is operatively associated with second drive gear 38 such that rotation of first drive gear 36 causes rotation of the second drive gear 38 and vice versa.

Starter-generator module 100 an outer rotor portion 110 at least a portion of which is arranged within a static housing 114. Outer rotor portion 110 includes a permanent magnet 112 (shown in FIG. 3) and a gear teeth member 116 respectively disposed about a rotation axis R. Gear teeth member 116 is defined on an outer rotor portion 110, and in the illustrated embodiment extends axially along and circumferentially about rotation axis R. Gear teeth member 116 is arranged between first drive gear 36 and second drive gear 38, intermeshes with first drive gear 36 and second drive gear 38, and is configured and adapted to transfer rotation energy therebetween. It is contemplated that gear teeth member 116 can drive or be driven by either or both of first drive gear 36 and second drive gear 38. One or more accessories (not shown for clarity reasons) are connected to gear train 40 such that the accessories can be powered by turbine interconnect shaft 34. This allows for direct integration starter-generator module 100 into accessory gearbox 30 (e.g. without an interconnecting shaft). It can also improve heat rejection by allowing heat dissipation through the stator, potentially reducing or eliminating the need for removing with coolant.

Figure 3:
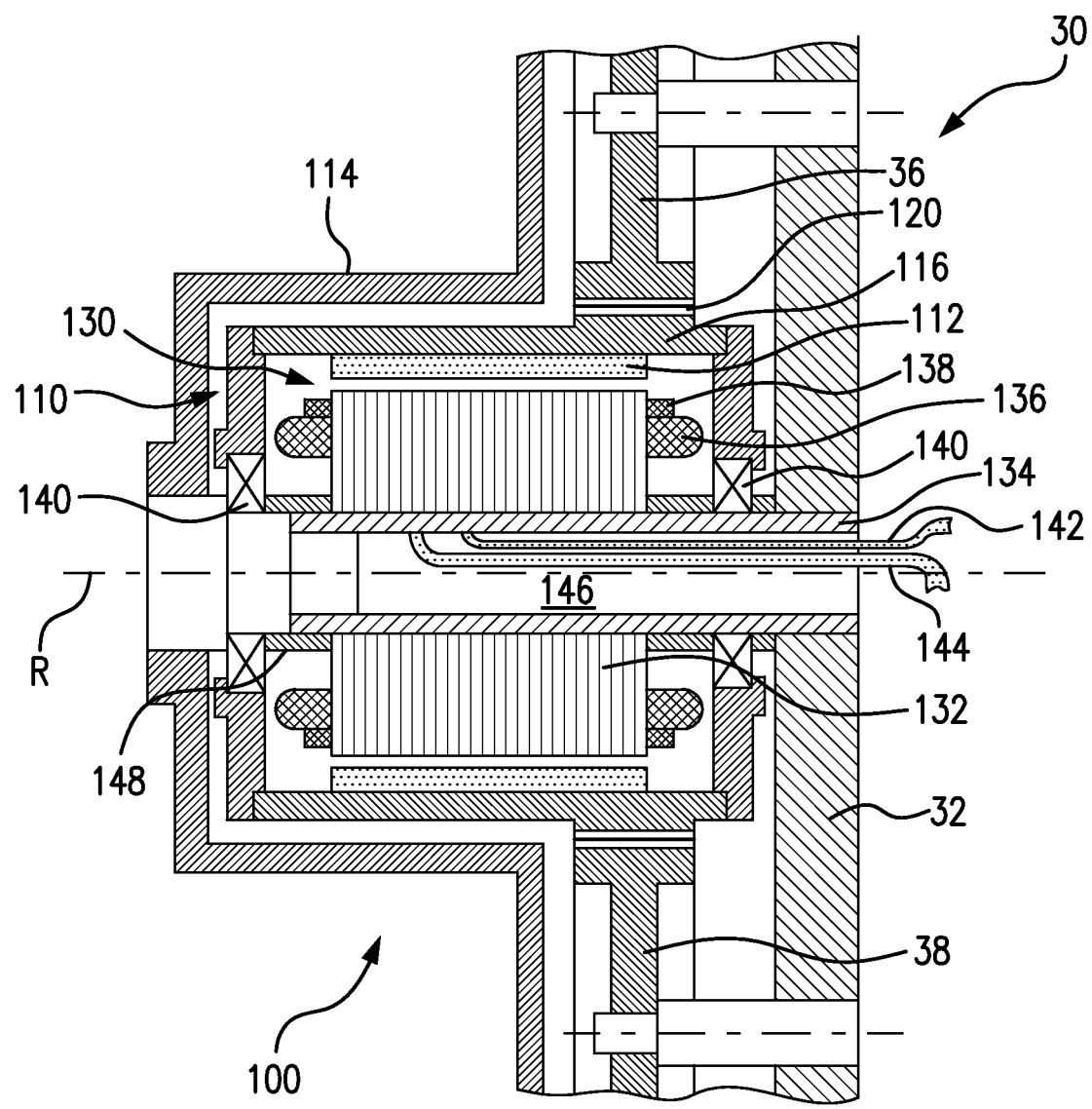
FIG. 3 is schematic cross-sectional side elevation view of the accessory gearbox and starter generator of FIG. 1, shown the components of the starter-generator.

With reference to FIG. 3, a portion of accessory gearbox 30 and starter-generator module 100 are shown schematically in a longitudinal cross-sectional view. Starter-generator module 100 includes outer rotor portion 110 and inner stator portion 130. Teeth 120 of gear teeth member 116 face radially outward from rotation axis R. In embodiment, gear teeth member 116 forms a pinion gear (e.g. a rotor integrated with a toothed gear wheel) arranged between first drive gear 36 and second drive gear 38.

Inner stator portion 130 includes an armature 132, a post 134, phase windings 136, and a control coil 138. Post 134 extends along rotation axis R and is fixed to accessory gearbox 30. Armature 132 is seated on post 134 and includes a laminated steel core formed from a plurality of steel sheet. Phase windings 136 wrap around armature 132 and extend along rotation axis R. Control coil 138 is disposed radially outward from phase windings 136 and is connected to armature 132. Control coil 138 has a smaller axial length than phase windings 136, both proximate and distal ends of phase windings 136 respectively extending beyond opposed ends of control coil 138. Bearings 140 connected gear teeth member 116 of outer rotor portion 110 and post 134 inner stator portion 130 rotatably support outer rotor portion 110 and enable rotation of outer rotor portion 110 about inner stator portion 130. In embodiments, one of more intervening structures can be disposed between post 134 and bearings 140, starter-generator module 100 including a bushing 148 seated between bearings 140 and post 134 for example. This arrangement can provide a relatively small moment of inertia along the rotation axis and low mechanical vibration due levels due to the use of only one electrical machine, the length of post 134, and a short distance between bearings 140.

Starter-generator module 100 includes a windings lead 142 and a control coil lead 144. Windings lead 142 is electrically connected between a phase winding current source (not shown for clarity purposes) and phase windings 136. Control coil lead 144 is electrically connected between a control coil current source (not shown for clarity purposes) and control coil 138. In the illustrated embodiment, post 134 has a hollow interior 146 and both windings lead 142 and control coil lead 144 extend through a portion of hollow interior 146, pass through armature 132, and electrically connect with phase windings 136 and control coil 138.

It is to be understood and appreciated that starter-generator module 100 can be a multiphase starter-generator module. Each phase of the multiphase starter-generator module 100 can have one or more windings associated a given phase, and windings lead 142 can include a plurality of windings leads that electrically respectively connect the one or more windings associated with a given phase. It is also to be understood and appreciated that control coil lead 144 can be a plurality of leads interconnecting a plurality of control coils 138 arranged circumferentially about inner stator portion 130.

Figure 4:
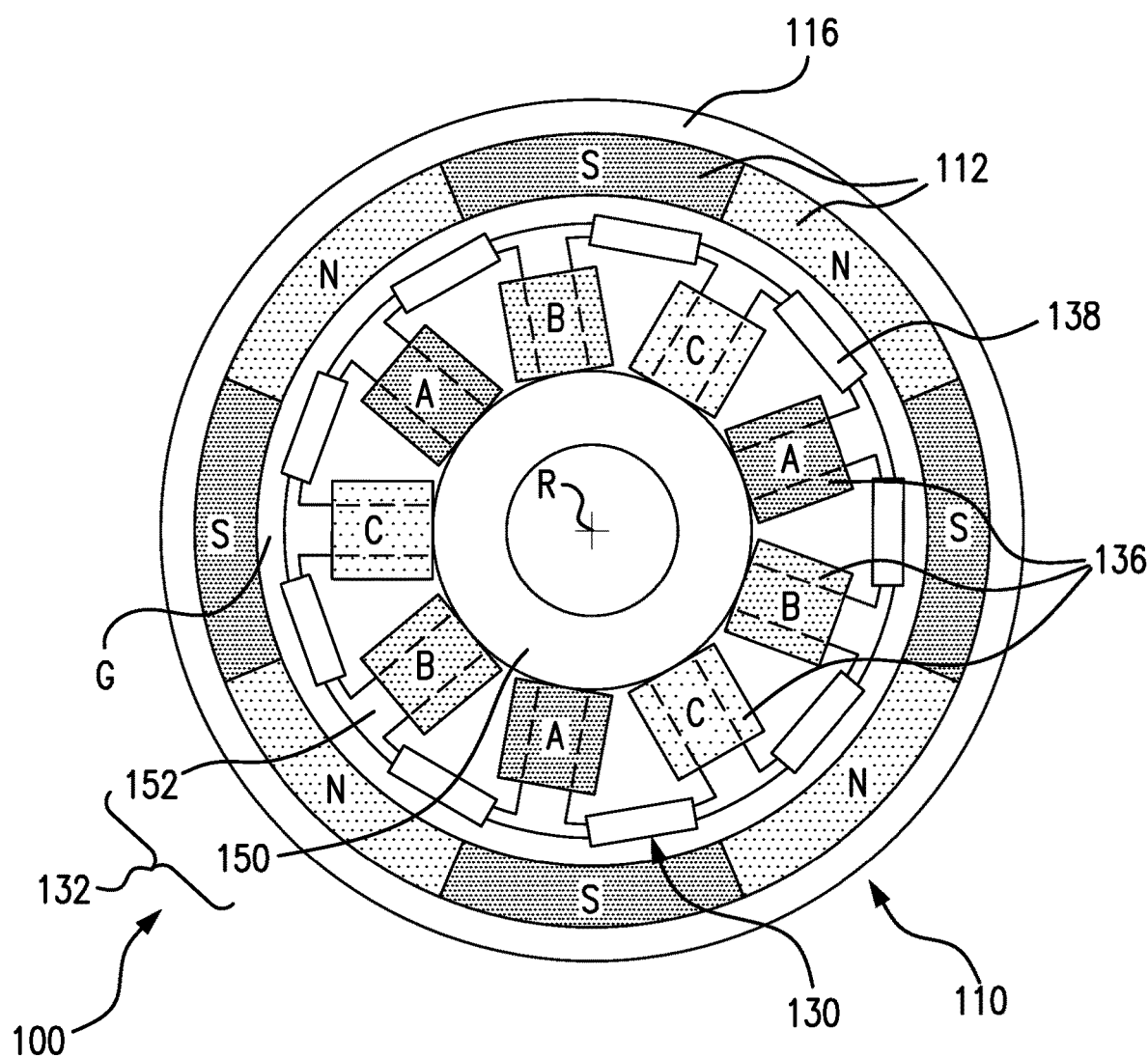
FIG. 4 is a schematic axial end view of the starter-generator of FIG. 1, showing the rotor and stator.

With reference to FIG. 4, starter-generator module 100 is shown schematically in an axial end view. Outer rotor portion 110 includes gear teeth member 116 and permanent magnet 112. Permanent magnet 112 is arranged radially inward of gear teeth member 116 and is circumferentially segmented by pole. The pole segments are arranged about a radially inner periphery of outer rotor portion 110 such that the pole of a given segment is circumferentially bounded by a segment having the opposite pole. This circumferentially alternates poles about the inner periphery of outer rotor portion 110 in a windingless outer rotor portion 110.

Inner stator portion 130 includes armature 132, phase windings 136, and control coil 138. Armature 132 defines an inner yoke portion 150 and a plurality of outer teeth 152. Inner yoke portion 150 is arranged radially inward of outer teeth 152 and disposed about rotation axis R. Outer teeth 152 are connected to inner yoke portion 150 and arranged radially outward of from inner yoke portion 150. A circumferential gap G extends about the plurality of outer teeth 152 between inner stator portion 130 and outer rotor portion 110.

Starter-generator module 100 includes a plurality of phase windings 136. Respective phase windings 136 are wrapped about outer teeth 152. In the illustrated embodiment, starter-generator module 100 includes a three-phase inner stator portion 130 with an A-phase, a B-phase, and a C-phase. Each of the three phases includes a plurality of phase windings 136. Each phase winding of a given phase is circumferentially interspersed between phase windings 136 of other phases, A-phase windings separating adjacent B-phase and C-phase windings for example.

Starter-generator module 100 also includes a plurality of control coils 138. Control coils 138 are distributed circumferentially about the periphery of inner stator portion 130 such that respective control coils 138 bound circumferential gap G. Each control coil 138 is arranged between circumferentially adjacent phase windings 136. Each control coil 138 is also arranged radially outward from adjacent phase windings 136. This intersperses control coils 138 between phase windings 136 and permanent magnet 112, and potentially provides accurate control.

In embodiments, starter-generator module 100 includes a hybrid permanent magnet flux-controlled (i.e. regulated) generator with a rotor having a toothed gear wheel integrated into accessory gearbox 30 (shown in FIG. 3). In certain embodiments, starter-generator module 100 generator includes an outer rotor portion 110 integrated with a toothed wheel and an inner stator portion 130 located inside outer rotor portion 110. Inner stator portion 130 includes two winding groups: armature windings (e.g. phase windings 136), and control windings (e.g. control coils 138). Control coils 138 can receive either direct current or alternating current as a control current. To control the magnetic flux and output voltage, the control current should vary from zero to a predetermined maximum value, thereby saturating the outer portion of armature 132. It is contemplated that control coils 138 can be electrically connected in series, in parallel, or in series-parallel.

As shown in FIG. 4 inner stator portion 130 includes phase windings 136 forming concentrated coils. This is possible where the windings are arranged such that a winding with fractional number of slots per pole per phase conforms to:

$$\frac{N_c}{GCD(N_c, 2p)} = km_1$$

wherein:
$N_c$ is the number of armature coils,
p is the number of permanent magnet pole pairs,
2p is the number of poles,
GCD is the greatest common divisor,
$m_1$ is the number of armature phases, and
k is an integer.

In the exemplary winding shown in FIG. 4, $N_c$=9, 2p=8, and $m_1$=3. Determining the greatest common divisor of $N_c$ and 2p, we get GCD ($N_c$, 2p)=GCD (9, 8)=1. Solving for k such that $km_1$=9, we get k=3, thereby forming a winding with a slot coil span of one (i.e. unity). Other type of armature windings can be used, such as lap windings or concentric windings, thereby providing coil spans greater than unity.

In embodiments, starter-generator module 100 provides small and compact starter-generator modules using a permanent magnet, flux-regulated electrical machine architecture. In embodiments, starter-generator module 100 includes only one electrical machine set, and includes no exciter or no sub-exciter. This can provide high reliability (only one electrical machine instead of three-machine set). In certain embodiments, the starter-generator has windings only on the stator, has includes no windings on the rotor, and can include no slip rings or contactless energy transfer to rotating parts.

The methods and systems of the present disclosure, as described above and shown in the drawings, provide for starter-generator modules with superior properties including lightweight and/or compact arrangement. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A starter-generator module for a gas turbine engine, comprising:
   an inner stator portion with an armature defining a rotation axis, where the armature includes a radially inner yoke portion connected to a plurality of radially outer teeth;
   an outer rotor portion with a permanent magnet disposed about the rotation axis;
   a gear teeth member defined on the outer rotor portion, wherein the gear teeth member is configured to transmit rotational energy to an accessory gearbox in a start mode and to receive rotational energy from the accessory gearbox in a generate mode;
   phase windings wrapped about at least two of the plurality of radially outer armature teeth; and
   a control coil disposed circumferentially between the phase windings;
   wherein the inner stator portion extends through the gear teeth member, wherein the outer rotor portion is rotationally supported from the inner stator portion with a set of axially spaced apart bearings, wherein the gear teeth member is axially between the axially spaced apart bearings.

2. A starter-generator module as recited in claim 1, wherein the gear teeth member includes gear teeth facing radially outward from the rotation axis.

3. A starter-generator module as recited in claim 1, wherein the permanent magnet includes an annular array of permanent magnet elements with circumferentially alternating poles.

4. A starter-generator module as recited in claim 1, wherein the rotor portion is at least one of a windingless rotor portion and a currentless rotor portion.

5. A starter-generator module as recited in claim 1, further including a starter-generator static housing disposed radially outward of the gear teeth member, wherein teeth of the gear teeth member are oriented radially outward with respect to the rotation axis.

6. A starter-generator module as recited in claim 1 wherein the phase windings extend in parallel with the rotation axis.

7. A starter-generator module as recited in claim 1, wherein the control coil is disposed radially outward from the phase windings.

8. A starter-generator module as recited in claim 1, wherein the control coil extends in parallel with the rotation axis and along a portion of the length of the phase windings.

9. A starter-generator module as recited in claim 1, further including phase leads and control coil leads extending through the radially inner yoke portion, wherein the phase leads are electrically connected to the phase windings the control lead is electrically connected to the control coil.

10. A starter-generator module as recited in claim 1, wherein the starter-generator module includes only a single electrical machine.

11. The starter-generator module as recited in claim 1, wherein the starter-generator module includes no exciter.

12. The starter-generator module as recited in claim 1, wherein the starter-generator includes no sub-exciter.

* * * * *